United States Patent
Scheiber et al.

(10) Patent No.: US 7,353,566 B2
(45) Date of Patent: *Apr. 8, 2008

(54) ADJUSTABLE WHEEL ASSEMBLY

(75) Inventors: Philip Scheiber, Denver, CO (US); Steven L. Lindquist, Arvada, CO (US); Brandon Mckee, Boulder, CO (US); Allen B. Killebrew, Longmont, CO (US); Rex W. Stevens, Longmont, CO (US); Ralf Groene, Boulder, CO (US); Michael Knopf, Dielheim (DE)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/454,756

(22) Filed: Jun. 4, 2003

(65) Prior Publication Data

US 2004/0003482 A1    Jan. 8, 2004

Related U.S. Application Data

(60) Provisional application No. 60/386,050, filed on Jun. 5, 2002.

(51) Int. Cl.
*B60B 33/04*    (2006.01)

(52) U.S. Cl. .............................. 16/19; 16/18 R; 16/22; 16/29; 280/250.1

(58) Field of Classification Search .................... 16/19, 16/18 R, 45, 20, 23, 18 A; 280/250.1
See application file for complete search history.

(56) References Cited

U.S. PATENT DOCUMENTS

| 774,042 | A | | 11/1904 | Copper |
|---|---|---|---|---|
| 1,922,099 | A | * | 8/1933 | Kilian .......................... 16/38 |
| 2,918,300 | A | * | 12/1959 | Hendrickson ............... 280/80.1 |
| 4,669,146 | A | * | 6/1987 | Saito et al. .................. 16/18 A |
| 4,721,321 | A | * | 1/1988 | Haury et al. ............. 280/250.1 |
| 4,722,114 | A | * | 2/1988 | Neumann .................... 16/35 R |
| 4,969,232 | A | * | 11/1990 | Michel ......................... 16/350 |
| 4,989,890 | A | * | 2/1991 | Lockard et al. ............... 280/42 |
| 5,131,672 | A | * | 7/1992 | Robertson et al. ........ 280/250.1 |
| 5,294,142 | A | * | 3/1994 | Weege ..................... 280/304.1 |
| 5,360,224 | A | * | 11/1994 | Geiger et al. ............ 280/250.1 |
| 5,377,372 | A | * | 1/1995 | Rudolf et al. .................. 5/600 |
| 6,041,876 | A | * | 3/2000 | Pulver et al. .............. 180/65.1 |

(Continued)

FOREIGN PATENT DOCUMENTS

DE              9211745             11/1992

(Continued)

*Primary Examiner*—Jennifer H. Gay
*Assistant Examiner*—Mark Williams
(74) *Attorney, Agent, or Firm*—MacMillan, Sobanski & Todd, LLC

(57) ABSTRACT

An improved wheel assembly comprises a caster fork, a caster wheel rotatably supported by the caster fork, and a caster swivel post defining an axis about which the caster fork rotates. The caster swivel post is being adapted to rotate about a pivot axis within a cylindrical housing. Alternatively, the wheel assembly has an adjustable axle for varying the camber angle of a wheel. The wheel assembly comprises a housing and an axle supported by the housing. The axle in turn rotatably supports a wheel. The axle is adapted to rotate about a pivot axis within a cylindrical housing.

11 Claims, 6 Drawing Sheets

U.S. PATENT DOCUMENTS

| | | | |
|---|---|---|---|
| 6,113,117 A * | 9/2000 | Mimura | 280/47.11 |
| 6,311,999 B1 * | 11/2001 | Kueschall | 280/250.1 |
| 6,533,306 B2 * | 3/2003 | Watkins | 280/304.1 |
| 6,543,798 B2 * | 4/2003 | Schaffner et al. | 280/250.1 |
| 6,944,910 B2 * | 9/2005 | Pauls | 16/35 D |

FOREIGN PATENT DOCUMENTS

| WO | WO 98/35841 | 8/1998 |
|---|---|---|

* cited by examiner

ADJUSTABLE WHEEL ASSEMBLY

CROSS REFERENCE TO RELATED APPLICATIONS

This application claims the benefit of U.S. Provisional Patent Application No. 60/386,050, filed on Jun. 5, 2002.

BACKGROUND OF INVENTION

This invention relates in general to improvements in wheel assemblies of the type used with wheelchairs and other devices. More particularly, this invention relates to an improved caster wheel assembly having an adjustable caster swivel post for varying the angle of the caster swivel post to ensure that the caster swivel post remains in a vertical orientation. Moreover, this invention relates to an improved rear wheel assembly having an adjustable axle for varying the camber angle of the axle.

Caster wheel assemblies in general are well known in the art for use with many different types of castered devices. Such caster wheel assemblies are commonly employed as the front wheels in a typical wheelchair. Each caster wheel assembly typically includes a caster fork, which rotatably supports a relatively small diameter caster wheel, and which further includes a generally upright caster swivel post captured by appropriate caster post bearings for rotation about a swivel axis within a fixed cylindrical housing. The fixed housing is adapted in turn for mounting onto frame components of the wheelchair, or other castered device. Such caster wheel assemblies beneficially provide a high degree of turning maneuverability.

The caster swivel post defines a vertically oriented axis about which the caster fork rotates. The caster post bearings are typically used to provide a smooth, frictionless pivot. The caster wheel is rotatably supported by the caster fork via a caster wheel axle, which is situated rearward with respect to the caster swivel post. This ensures that the caster wheel axle is always trailing the caster swivel post in the direction of travel. The rearward offset distance of the caster wheel axle with respect to the caster swivel post is commonly referred to as the "rake". The caster swivel post must be oriented vertically to ensure that the caster wheel remains in contact with a supporting surface as the caster fork pivots about the caster swivel post. This vertical orientation ensures that the caster wheel will not lift off the supporting surface while turning.

Wheelchairs and other castered devices typically incorporate a number of adjustments, including wheel height adjustment, wheel camber adjustment, and wheel size adjustment. Such adjustments are common with regard to the rear wheels of the wheelchair to allow a wheelchair occupant to customize the wheelchair to his or her anthropometry or driving conditions. When any of these adjustments are made, the angle of the caster swivel post changes and must also be adjusted to ensure that the caster swivel post remains vertical. Various means have been used to achieve caster swivel post angle adjustment, and are currently available on the market. Such means are typically bulky, heavy, and cumbersome for the user to adjust.

What is needed is an improved adjustable wheel assembly having a unique means for providing adjustability and that is a very compact, lightweight, and easy for the user to adjust.

SUMMARY OF INVENTION

The present invention is directed toward an improved caster wheel assembly that meets all the foregoing needs. The caster wheel assembly comprises a caster fork, a caster wheel rotatably supported by the caster fork, and a caster stem defining an axis about which the caster fork rotates. The caster stem is being adapted to rotate about a pivot axis within a cylindrical housing.

Moreover, this invention relates to an improved wheel assembly having adjustable axle for varying the camber angle of a wheel. The wheel assembly comprises a housing and an axle supported by the housing. The axle, in turn, rotatably supports a wheel. The axle is adapted to rotate about a pivot axis within a cylindrical housing.

Various objects and advantages of this invention will become apparent to those skilled in the art from the following detailed description of the preferred embodiment, when read in light of the accompanying drawings.

DETAILED DESCRIPTION

Figure 2:
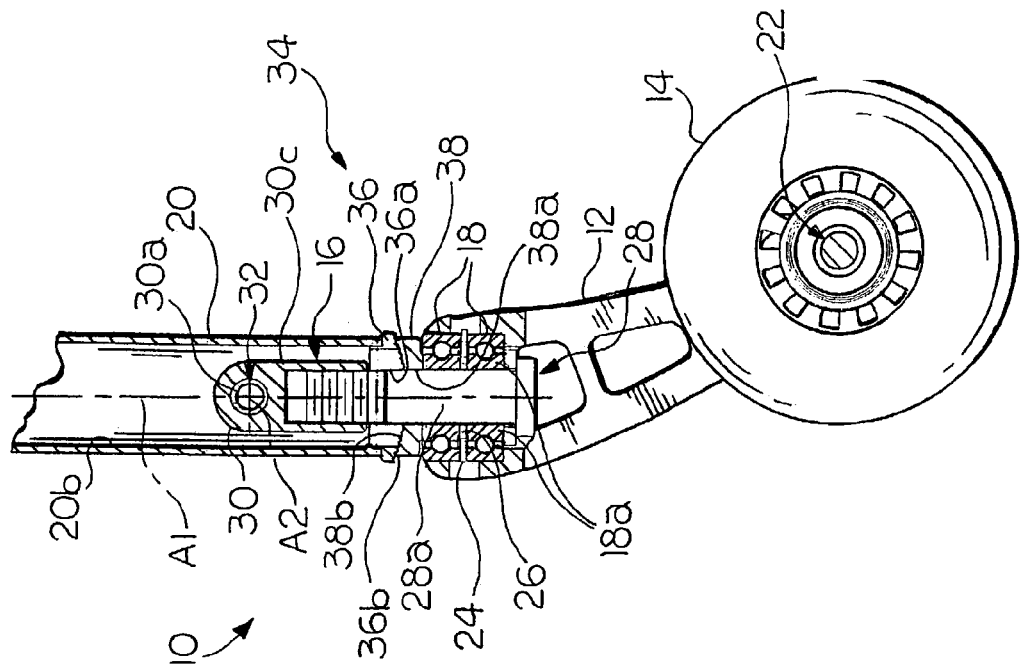
FIG. 2 is a cross-sectional view of the caster wheel assembly taken along the lines 2-2 in FIG. 1.
Figure 1:
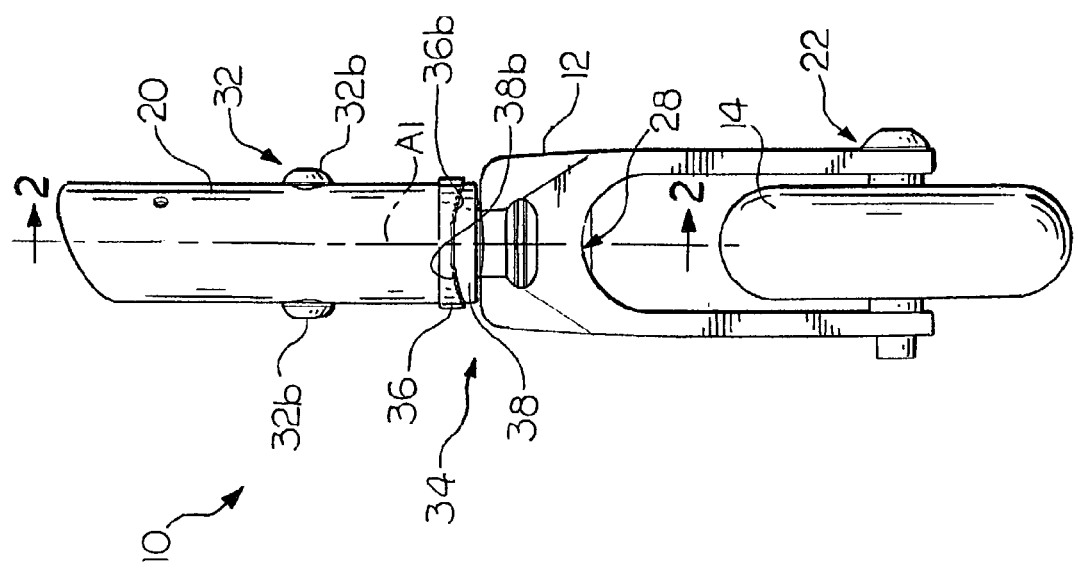
FIG. 1 is a rear elevational view of an improved caster wheel assembly according to the invention.
Figure 3:
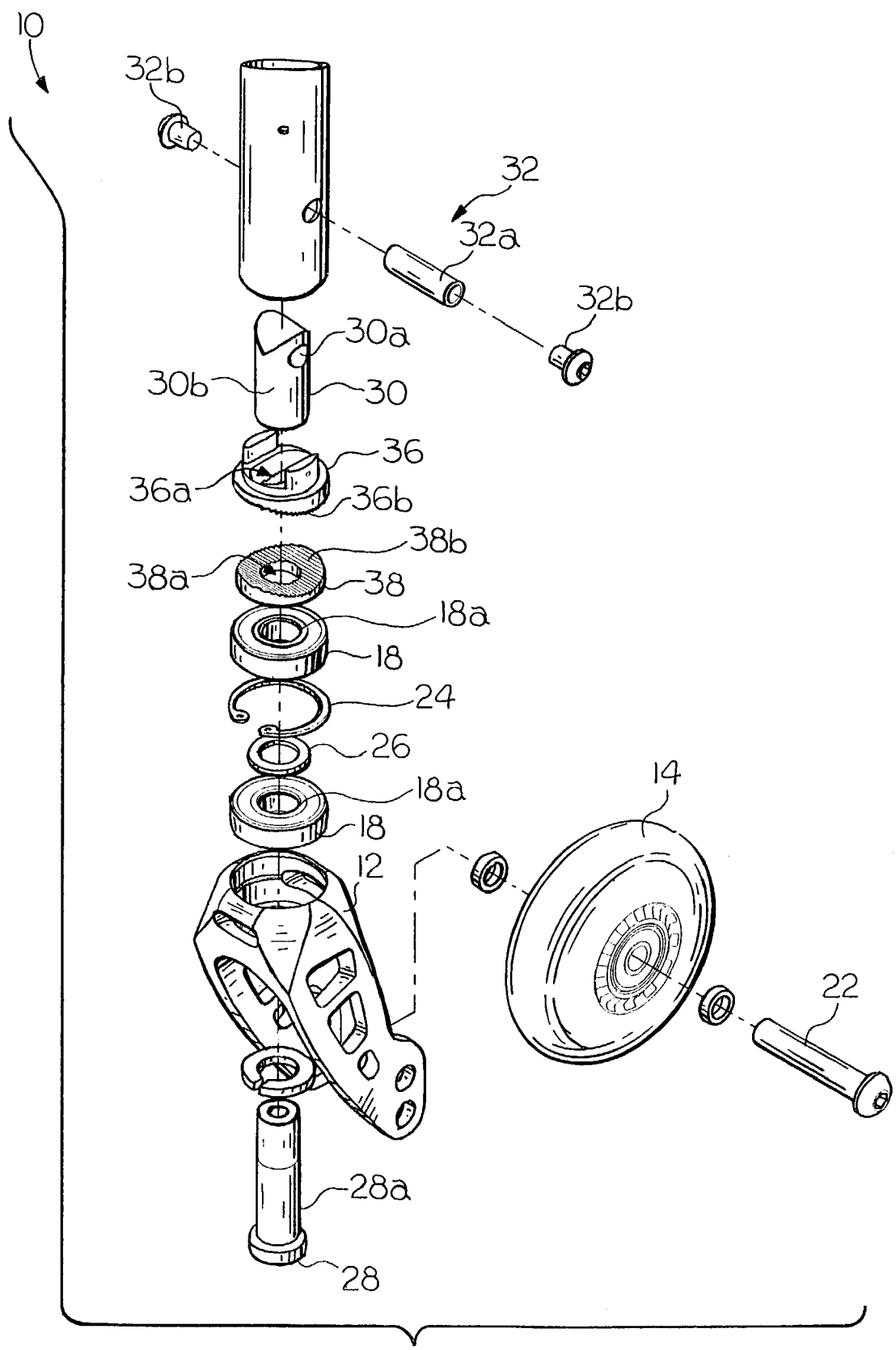
FIG. 3 is an exploded front perspective view of the caster wheel assembly illustrated in FIGS. 1 and 2.

Referring now to the drawings, there is illustrated in FIGS. 1-3 an improved caster wheel assembly 10 for use with many different types of castered devices (not shown). Caster wheel assemblies 10 according to the invention are particularly useful as the front wheels in a typical wheelchair (not shown). The caster wheel assembly 10 comprises a caster fork 12, which rotatably supports a relatively small diameter caster wheel 14, and which further includes a generally upright caster swivel post 16 captured by the caster fork 12 by appropriate caster post bearings 18. The caster swivel post 16 is adapted to pivot about a pivot axis A1 within a fixed cylindrical housing 20. The fixed housing 20 is adapted, in turn, for mounting onto frame components of the wheelchair or other castered device. The caster wheel assembly 10 provides a high degree of turning maneuverability.

The caster swivel post 16 defines a vertically oriented axis about which the caster fork 12 rotates. This axis is coincident with the pivot axis A1 described about. The caster post bearings 18 are typically used to provide a smooth, frictionless pivot. The caster wheel 14 is rotatably supported by the caster fork 12 via a caster wheel axle 22, which is situated rearward, or toward the right when viewing FIG. 2, with respect to the caster swivel post 16. This ensures that the caster wheel axle 22 is always trailing the caster swivel post 16 in the direction of travel, or toward the left when viewing FIG. 2. The caster swivel post 16 must be oriented vertically, or along the vertically oriented axis A1, to ensure that the caster wheel 14 remains in contact with a supporting surface (not shown) as the caster fork 12 pivots about the caster swivel post 16. This vertical orientation ensures that the caster wheel 14 will not lift off the supporting surface while turning.

Continuing with reference to FIGS. 2-3, the caster post bearings 18 are preferably press fit within the caster fork 12 so that the caster post bearings 18 are concentric with respect to one another. Although two caster post bearings 18 are shown, it should be appreciated by one of ordinary skill in the art of the invention that one or more caster post bearings or bushings may be suitable for carrying out the invention. An internal retaining ring 24 is provided for retaining and/or spacing the caster post bearings 18 within the housing 20. A flat washer 26 is provided within the internal retaining ring 24 and concentric with the caster post bearings 18. The flat washer 26 is provided to maintain a spaced relation between the inner raceway 18a of the caster post bearings 18.

The caster swivel post 16 is comprised of a stem bolt 28 having a shaft 28a having a lower end that mates with the inner raceway 18a of the caster post bearings 18. This allows the stem bolt 28 to rotate freely with respect to the caster fork 12. An upper end of the shaft 28a of the stem bolt 28 is threaded so as to thread into a pivot nut 30 within the housing 20. A pivot pin 32 passes through a cross-hole 30a in the pivot nut 30, such that the pivot nut 30 can rotate about the pivot pin 32, or about a pivot axis A2 defined by the pivot pin 32, while remaining captive within the housing 20. The pivot pin 32 is held fixed within the housing 20. The pivot pin 32 may be comprised of, but is not limited to, a bolt and nut, a dowel pin with one or more retaining rings, or a pin, such as the pivot pin 32 shown, with a central tapped hole 32a held secure by two end screws 32b.

Figure 5:
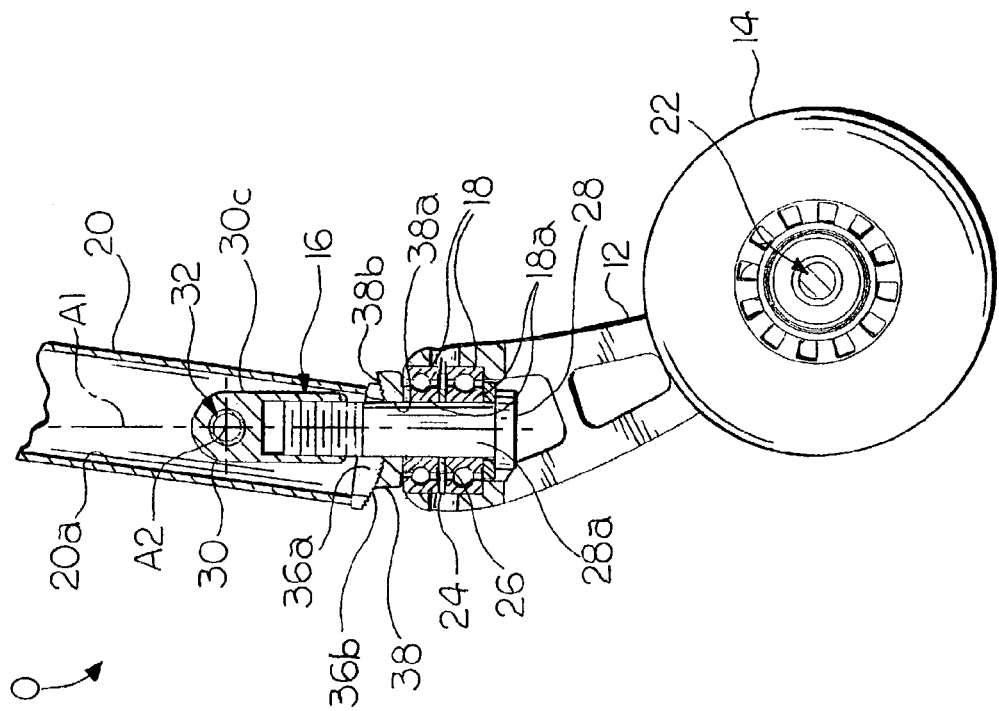
FIG. 5 is a reduced cross-sectional view of the caster wheel assembly illustrated in FIG. 2, wherein the caster swivel post is adjusted rearward with respect to the housing.
Figure 4:
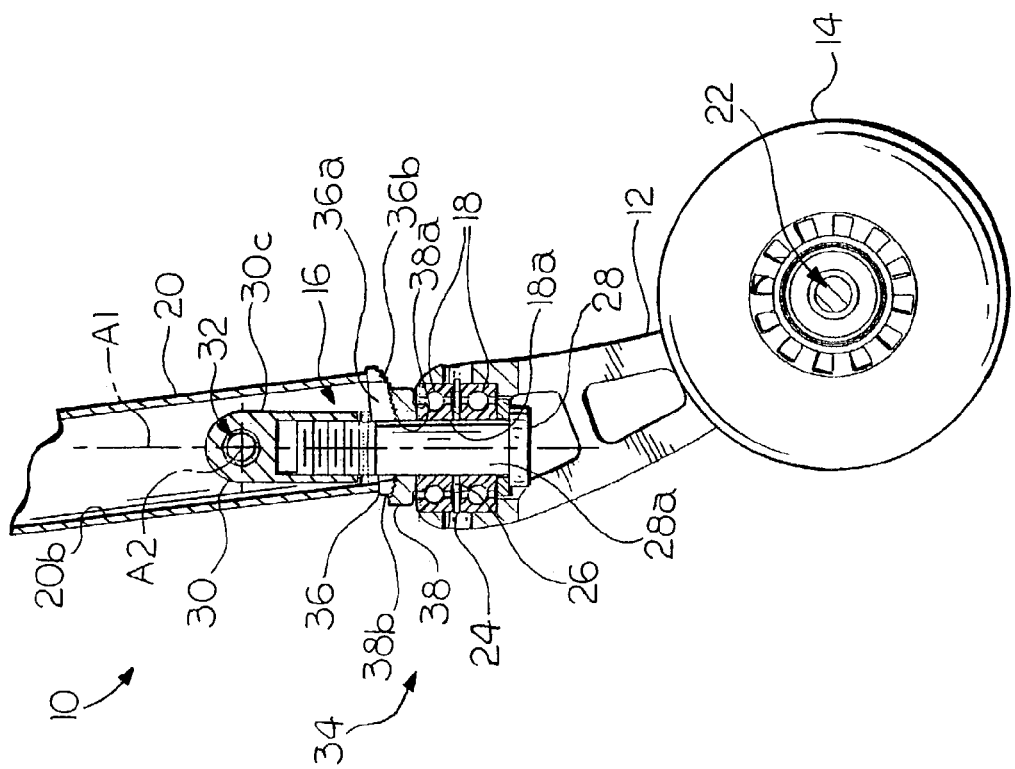
FIG. 4 is a reduced cross-sectional view of the caster wheel assembly illustrated in FIG. 2, wherein the caster swivel post is adjusted forward with respect to the housing.

A spline assembly, generally indicated at 34, resides between the housing 20 and an upper one of the caster post bearings 18 within the caster fork 12. The spline assembly 34 comprises an upper spline 36 that is in fixed relation to the housing 20 and a lower spline 38 that is in a fixed relation to the caster fork 12. The upper and lower splines 36, 38 can be integral with the corresponding housing 20 and caster fork 12 or may be supported on separate members, as illustrated in the drawings. The upper spline 36 has a central slot 36a therein while the lower spline 38 has a central hole 38a. The stem bolt 28 passes through the central hole 38a in the lower spline 38 and the central slot 36a in the upper spline 36. When the stem bolt 28 is tightened into the pivot nut 30, teeth 38b on the lower spline 38 lock into engagement with the mating teeth 36b on the upper spline 36, fixing the angular position of the caster swivel post 16 with respect to the frame of the wheelchair or castered device (not shown). The center of curvature of the spline teeth 36b, 38b is coincident with the pivot axis A2. The teeth 38b, 36b on the lower and upper splines 38, 36 are preferably spaced two degrees apart along this radius of curvature, providing two-degree increments of adjustment of the caster swivel post 16 with respect to the frame of the wheelchair or castered device. Because the pivot nut 30 can rotate about the pivot axis A2, the pivot nut 30 remains aligned with the stem bolt 28 over the range of angle adjustment of the caster swivel post 16. The total range of adjustment of the caster swivel post 16 is limited by the clearance between the inner diameter 20a of the housing 20 and the outer diameter 30c of the pivot nut 30. According to a preferred embodiment of the invention, the inside diameter 20a of the housing 20 and outside diameter 30b of the pivot post 30 are dimensioned to permit a total adjustment range of about eight degrees forward and rearward relative to the housing 20, as shown in FIGS. 4 and 5. It should be appreciated by one of ordinary skill in the art of the invention that the caster wheel assembly 10 could be modified to provide coarser or finer increments of adjustment, or a different range of adjustment, depending on the particular wheelchair or castered device application.

In operation, the stem bolt 28 can be loosened until the teeth 36b on the upper spline 36 and the teeth 38b on the lower spline 38 separate enough to clear one another. The pivot nut 30 is then pivoted about the pivot axis A2 until the new desired angle is achieved. As clearly illustrated in the drawings, the pivot nut 30 can be pivoted forward relative to the housing 20, or in a counter-clockwise direction when viewing FIG. 4, or rearward relative to the housing 20, or in a clockwise direction when viewing FIG. 5. Ideally the angle is adjusted with the stem bolt 28 as close to vertical when the wheelchair or other castered device (not shown) is on a level supporting surface. The stem bolt 28 is then tightened, causing the spline teeth 36b, 38b to engage, locking the caster swivel post 16 in a desired angular position.

The foregoing caster wheel assembly 10 is very compact and lightweight. This is achieved by placing the caster post bearings 18 in the caster fork 12, rather than in the housing 12. Placing the caster post bearings 18 in this location allows the pivot assembly to occupy the housing 12. Because most of the angle adjustment components are internal to either the housing 20 or the caster fork 12, the design is extremely compact and efficiently integrated into the wheelchair or other castered device. This produces a lightweight and low profile appearance.

It should be clearly understood that the present invention is not intended to be limited in scope to the preferred embodiment of the invention described hereinabove. Several examples of alternative embodiments of the invention are described hereinbelow.

Figure 6:
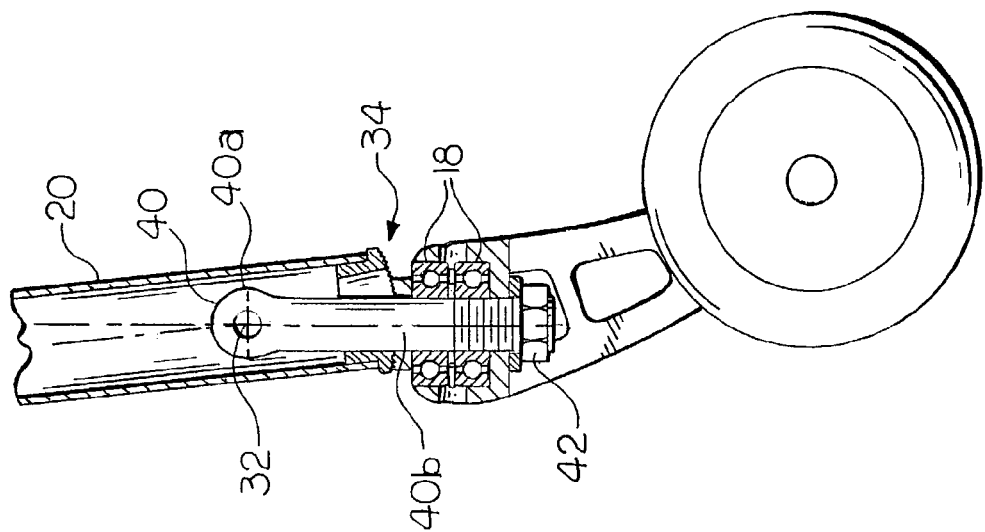
FIG. 6 is a sectional view of an improved caster wheel assembly according to another embodiment of the invention, wherein the caster swivel post is adjusted forward with respect to the housing.

As illustrated in FIG. 6, an upper end 40a of a pivot stem bolt 40, instead of the pivot nut 30 illustrated above, can be supported within the housing 20 by the pivot pin 32. A stem nut 42 beneath of the caster post bearings 18 on the lower end 40b of the pivot stem bolt 40 serves to fix the spline assembly 34 between the caster post bearings 18 and the housing 20 so as to retain the caster swivel post in a desired angular position. The form and function of this embodiment is similar to the embodiment described above.

Figure 7:
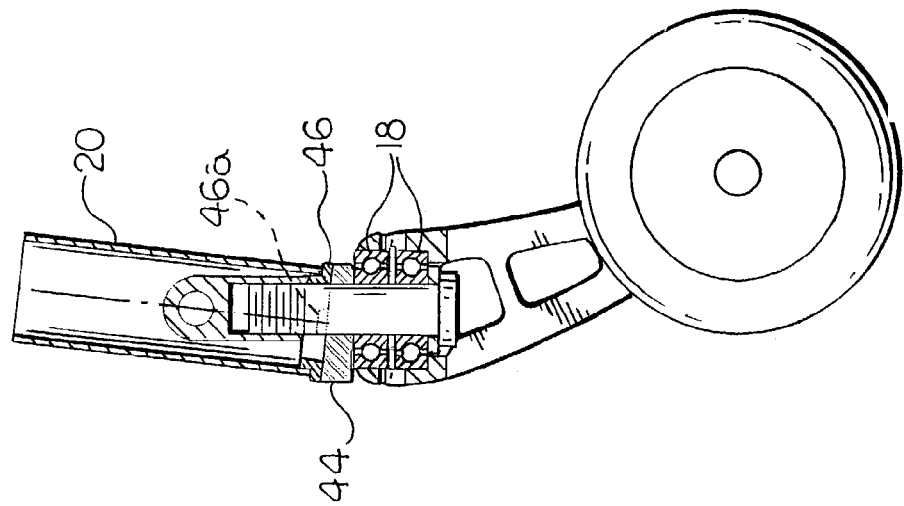
FIG. 7 is a cross-sectional view of an improved caster wheel assembly according to yet another embodiment of the invention, wherein the caster swivel post is adjusted rearward with respect to the housing.

Another embodiment of the invention is illustrated in FIG. 7. This embodiment of the invention comprises an angled wedge 44 between the caster post bearings 18 and the housing 20. The wedge 44 functions to retain the caster swivel post 16 in a desired angular position. The wedge 44 is secured in compression between the caster post bearings 18 and an engagement key slot 46a in a slotted member 46 fixed relative to the housing 20. In order to adjust the angle of the caster swivel post 16, the wedge 44 is removed from the assembly, and reoriented, or replaced by a wedge, or series of wedges, having a different angle. Mating features on the engagement key slot 46a and the wedge 44 ensure that the wedge 44 is properly aligned when installed. These features allow the wedge 44 to be installed in two different positions by rotating the wedge 180 degrees about the caster swivel post 16. It should be appreciated by one of ordinary skill in the art of the invention that the invention is not intended to be limited to the wedge shown but may be carried out with any components with mating or interlocking shapes, including but not limited to components having curved surfaces, hexentric shapes, curved acme threads, and curved unified threads.

Figure 8:
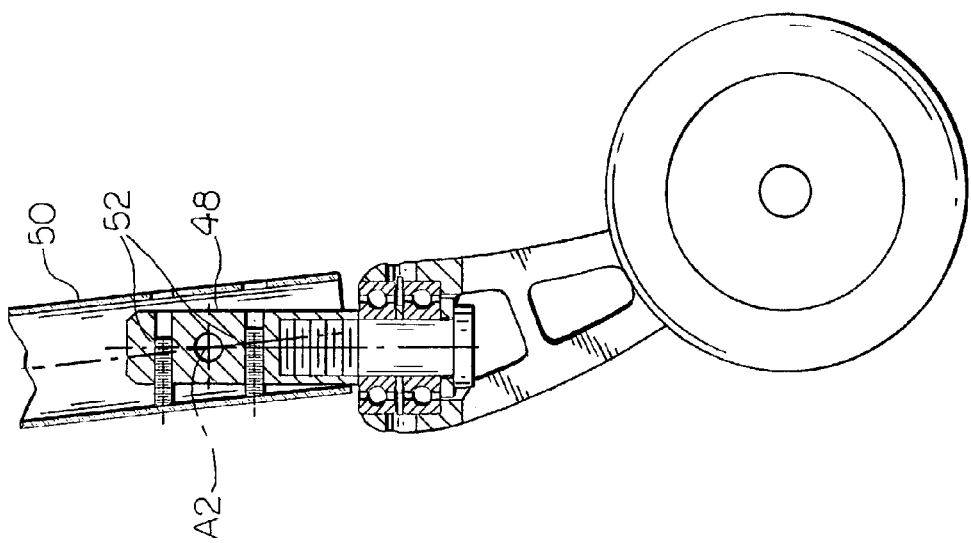
FIG. 8 is a cross-sectional view of an improved caster wheel assembly according to still another embodiment of the invention, wherein the caster swivel post is adjusted forward with respect to the housing.

Yet another embodiment of the invention is illustrated in FIG. 8. This embodiment of the invention comprises a pivot nut 48 that resides within a housing 50, and which is allowed to rotate about a pivot axis A2 within the housing 50. Two setscrews 52 are threaded into the pivot nut 48 and bear against the housing 20 above and below the pivot axis A2 to prevent the pivot nut 48 from pivoting. The setscrews 52 are used to adjust and fix the angle of the pivot nut 48 with respect to the wheelchair or other castered device (not shown). The user can change the angle of the pivot nut 48 by adjusting setscrews 52 accordingly to fix the angle of the pivot nut 48 with respect to the wheelchair or other castered device. For example, to change the angle of the pivot nut 48 so that the pivot nut 48 pivots rearward, or in a counter-clockwise direction when viewing FIG. 8, the user loosens the upper setscrew 52, or moves the upper setscrew 52 to the left when viewing FIG. 8, and tightens the lower setscrew 52, or moves the lower setscrew 52 to the right when viewing FIG. 8. The upper setscrew 52 resist movement of the pivot nut 48 in a counter-clockwise direction when viewing FIG. 8 and the lower setscrew 52 resist movement of the pivot nut 48 in a clockwise direction when viewing FIG. 8. It should be appreciated by one of ordinary skill in the art of the invention that the threaded setscrews 52 may be threaded into a pivot stem bolt instead of the pivot nut 48 shown.

Figure 9:
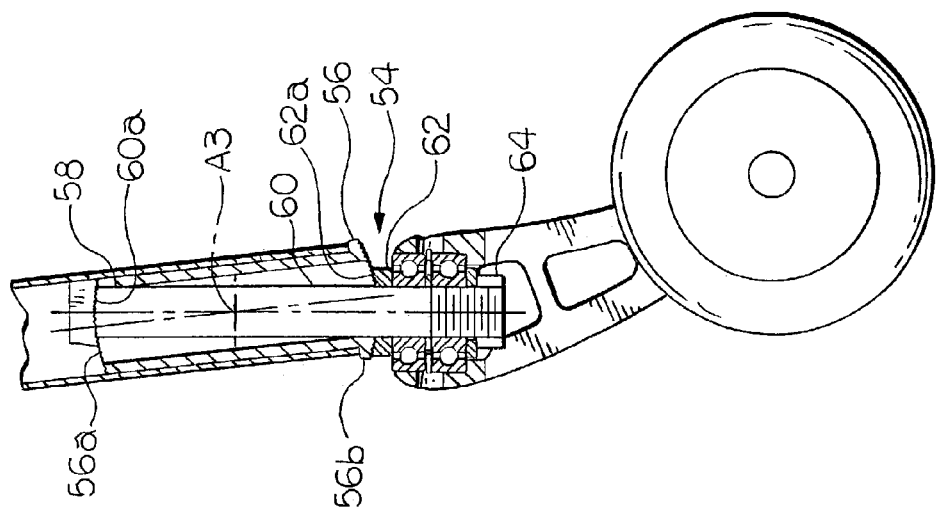
FIG. 9 is a cross-sectional view of an improved caster wheel assembly according to another embodiment of the invention, wherein the caster swivel post is adjusted forward with respect to the housing.

Still another embodiment of the invention is illustrated in FIG. 9. This embodiment of the invention comprises a spline assembly 54 similar in function to the spline assembly 34 of the preferred embodiment set forth above, except that the pivot axis has been omitted. A spline insert 56 fixed within the housing 58 has upper and a lower spline surfaces 56a, 56b. These spline surfaces 56a, 56b are curved, having curvature that is concentric with a virtual axis A3 about which the pivot stem bolt 60 rotates when assuming different angular positions. The pivot stem bolt 60 has a concave spline surface 60a that engages the upper spline insert surface 56a. A spline washer 62 has an upper spline surface 62a that engages the lower spline insert surface 56b. A stem nut 64 tightened beneath the caster post bearings 18 secures the angular position of the pivot stem bolt 60.

Figure 10:
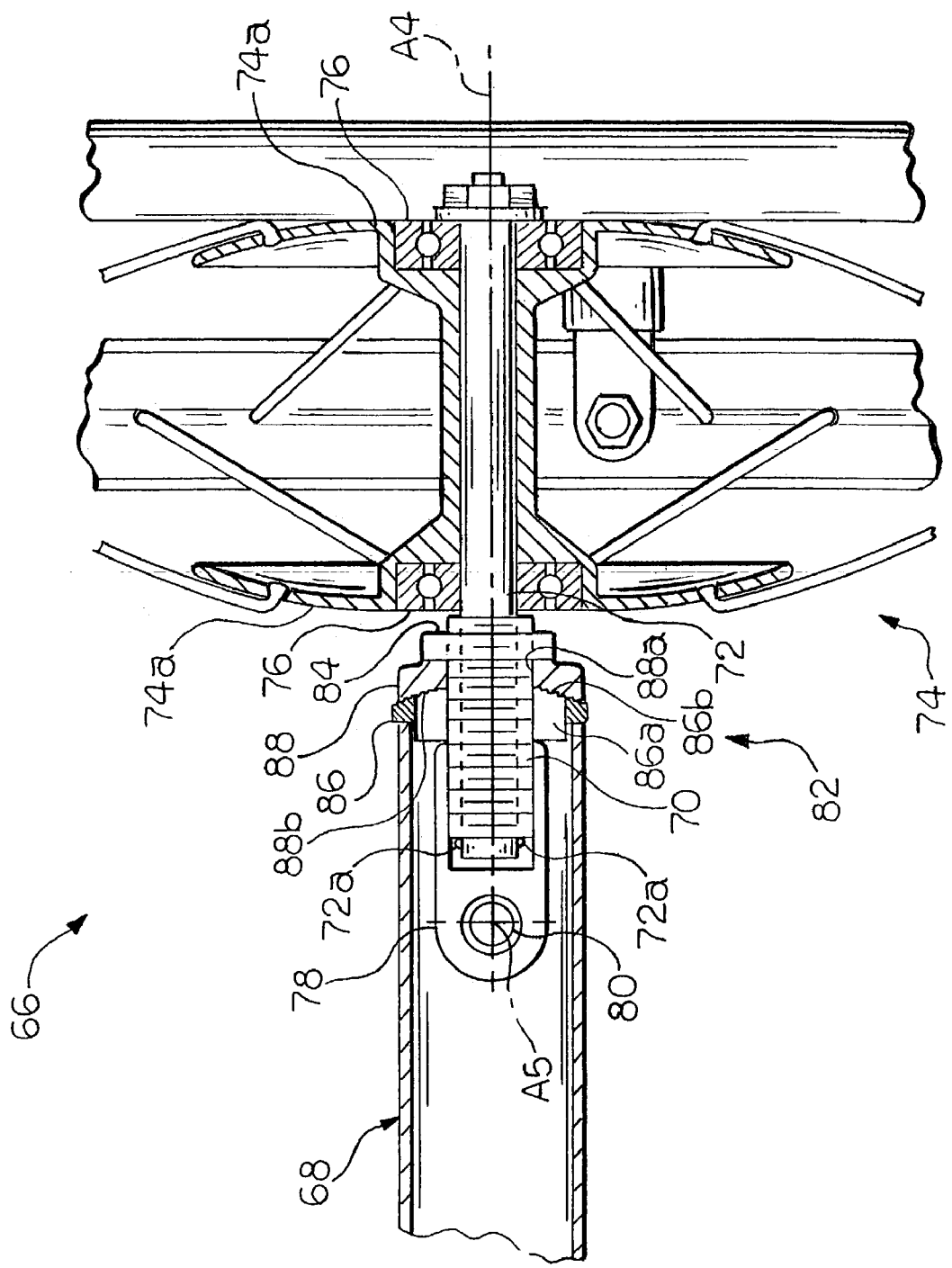
FIG. 10 is a partial sectional view of an improved rear wheel assembly according to the invention, wherein the axle sleeve is adjustable to change the camber angle of the rear wheel.

It further should be appreciated that the present invention is not intended to be limited in scope to caster assemblies, as set forth above, but could be applied to the rear wheels of a wheelchair (not shown) to allow for camber adjustment of the rear wheels. For example, there is illustrated in FIG. 10 a rear wheel assembly 66 comprising a housing 68, such as the cylindrical camber tube shown, that is adapted to be supported by the frame of a wheelchair (not shown). An axle sleeve 70 is supported by to the camber tube 68. An axle 72 is in turn adapted to be inserted into the axle sleeve 70 to rotatably support a relatively large diameter rear wheel 74 relative to the axle sleeve 70. The axle 72 may include one or more spring balls 72a that function to capture the axle 72 in the axle sleeve 70. The rear wheel 74 provides a driving force for propelling the wheelchair.

The axle 72 defines an axis A4 about which the rear wheel 74 rotates. Wheel bearings 76 are used to permit the axle 72 to rotate smoothly and without significant friction. The wheel bearings 76 are preferably press fit within the hub 74a of the rear wheel 74 so that the wheel bearings 76 are concentric with respect to one another. An inner end of the axle sleeve 70 is threaded so as to thread into a pivot nut 78 within the camber tube 68. A pivot pin 80 passes through a cross-hole 78a in the pivot nut 78, such that the pivot nut 78 can rotate about the pivot pin 80, or about a pivot axis A5 defined by the pivot pin 80, while remaining captive within the camber tube 68. The pivot pin 80 is held fixed within the camber tube 68.

A spline assembly, generally indicated at 82, resides between the camber tube 68 and an axle sleeve nut 84 on an outer end of the axle sleeve 70. The spline assembly 82 comprises an inner spline 86, which is in fixed relation to the camber tube 68, and an outer spline 88. The inner spline 86 has a central slot 86a therein while the outer spline 88 has a central hole 88a. The axle sleeve 70 passes through the central hole 88a in the outer spline 88 and the central slot 86a in the inner spline 86. When the axle sleeve nut 84 is tightened into the axle sleeve 70, teeth 88b on the outer spline 88 lock into engagement with the mating teeth 86b on the inner spline 86, fixing the angular position of the axle sleeve 70 with respect to the frame of the wheelchair (not shown).

It should be clearly understood that the invention is not intended to be limited in scope to the rear wheel assembly described hereinabove and that the invention can be practiced in numerous alternative embodiments including, for example, embodiments similar to those set forth above and illustrated in FIGS. 6-9.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A wheelchair comprising:
    a frame having a front end and a rear end; and
    a caster wheel assembly mounted in relation to the frame, and caster wheel assembly comprising:
        a housing having a longitudinal axis;
        a caster fork;
        a caster wheel supported relative to the caster fork;
        a caster swivel post about which the caster fork pivots, the caster swivel post being supported to pivot in forward and rearward directions about a pivot axis that is within the housing and transverse to the longitudinal axis of the housing; and
        a mechanism for holding the caster swivel post in a substantially fixed position.

2. The caster wheel assembly according to claim 1 further comprising an upper spline that is in fixed relation to the housing and a lower spline that is adapted to lock into engagement with the upper spline to fix the angular position of the caster swivel post with respect to the housing.

3. The caster wheel assembly according to claim 1 further comprising an angled wedge between the caster fork and the housing to retain the caster swivel post in a desired angular position.

4. The caster wheel assembly according to claim 1 wherein the caster swivel post is supported to pivot about a pivot axis that is perpendicular to the caster swivel post.

5. The caster wheel assembly according to claim 1 further comprising mating surfaces that lock together under tension in order to fix the angle of the caster swivel post with respect to the housing.

6. A wheelchair comprising:
   a frame having a front end and a rear end; and
   a caster wheel assembly mounted in relation to the frame, and caster wheel assembly comprising:
      a housing having a longitudinal axis;
      a caster swivel post that is supported to pivot in forward and rearward directions about a pivot axis within the housing and transverse to the longitudinal axis of the housing;
      a mechanism for holding the caster swivel post in a substantially fixed position;
      a caster fork supported for rotation about the caster swivel post; and
      a caster wheel supported for rotation by the caster fork.

7. The caster wheel assembly according to claim 6 further comprising an upper spline that is in fixed relation to the housing and a lower spline that is in a fixed relation to the caster fork, the lower spline being adapted to lock into engagement with the upper spline to fix the angular position of the caster swivel post with respect to the housing.

8. The caster wheel assembly according to claim 6 further comprising an angled wedge between the caster fork and the housing to retain the caster swivel post in a desired angular position.

9. The caster wheel assembly according to claim 6 wherein the pivot axis is perpendicular to the caster swivel post.

10. The caster wheel assembly according to claim 6 further comprising mating surfaces that lock together under tension in order to fix the angle of the caster swivel post with respect to the housing.

11. A wheelchair comprising:
    a frame having a front end and a rear end; and
    a caster wheel assembly mounted in relation to the frame, and caster wheel assembly comprising:
       a housing;
       a caster swivel post supported within the housing for pivotal movement in forward and rearward directions about a pivot axis within the housing and transverse to the longitudinal axis of the housing;
       a mechanism for holding the caster swivel post in a substantially fixed position;
       a caster fork supported relative to the caster swivel post; and
       a caster wheel rotatably supported by the caster fork.

* * * * *